W. H. GREGG & M. FORST.
APPARATUS FOR BREAKING WHITE LEAD FOAM.
No. 181,668.                          Patented Aug. 29, 1876.
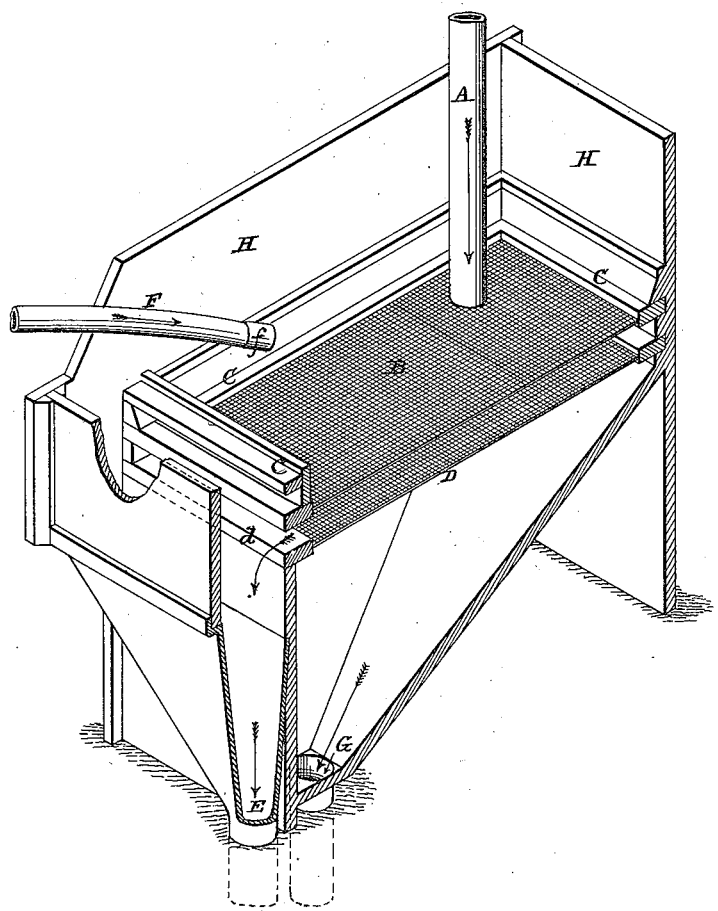
ATTEST:
Robert Burns.
Le Blond Burdett
INVENTOR:
William H. Gregg
Michael Forst
By Knight Bro.
Attys.

UNITED STATES PATENT OFFICE.

WILLIAM H. GREGG AND MICHAEL FORST, OF ST. LOUIS, MO., ASSIGNORS TO THE SOUTHERN WHITE LEAD COMPANY, OF SAME PLACE.

IMPROVEMENT IN APPARATUS FOR BREAKING WHITE-LEAD FOAM.

Specification forming part of Letters Patent No. 181,668, dated August 29, 1876; application filed June 7, 1876.

*To all whom it may concern:*

Be it known that we, WILLIAM H. GREGG and MICHAEL FORST, of St. Louis, in the county of St. Louis and State of Missouri, have invented a certain new and useful Apparatus for Breaking White-Lead Foam, of which the following is a full, clear, and exact description, reference being had to the accompanying drawing, making part of this specification.

Our invention relates to an apparatus for breaking the white-lead foam which forms while the lead is being ground in water while in the rake-tubs, while being pumped, and in the settling-tanks, thus reducing the foam to pulp white-lead. In this the foam is made to enter a descending pipe, discharging upon a fine screen, where the foam is subjected to the action of a jet of water, which descends upon it and carries it through the screen, thus breaking the bubbles.

The drawing is a perspective section.

A is a pipe leading from the settling or foam tank or tanks, and carrying therefrom the foam that forms in considerable quantity from the action of grinding in water, the agitators in the rake-tubs, or other causes. B is a fine sieve or screen, which has raised edges or flanges C to retain the foam or froth. D is a screen, beneath, B, which arrests and breaks any small bubbles that may have passed through the first screen, and when the foam accumulates upon the screen D in greater quantity than it can pass through, it overflows at the end *d*, and passes into a pipe, E, from which it is carried up to the pipe A to be worked over. F is a flexible water pipe or hose that may be turned in any direction, so that the jet from the nozzle *f* may be made to play upon the foam in any part of the screen B.

The effect of the water jet and screens is to break the bubbles, so that the water with the lead in suspension is nearly or quite clear of foam as it passes through the lower sieve or strainer D. The liquid, (pulp white-lead,) after passing through the screen D, is carried by a pipe, G, to the settling-tanks. H is a case surrounding and supporting the screens, &c.

The screens may be of gauze, constructed of brass or other wire, of foraminated plate metal, of cloth, or of any other suitable substance.

The water-pipe F may, if preferred, be fixed and arranged with a rose, or other jet, to discharge the water upon the whole surface of the foam in sieve or screen B.

We do not confine ourselves to two screens, B D, as any suitable number may be used in the vertical series.

We claim—

1. In an apparatus for breaking white-lead foam, the screen B, in combination with the foam duct A, substantially as set forth.

2. In an apparatus for breaking white-lead foam, the screen B, combined with the foam-duct A and water-pipe F discharging therein, substantially as and for the purpose set forth.

3. In an apparatus for breaking white-lead foam, the combination with the upper screen B of one or more screens, D, beneath it, with side overflows *d*, as and for the purpose set forth.

WILLIAM H. GREGG.
MICHAEL FORST.

Witnesses:
SAML. KNIGHT,
ROBT. BURNS.